United States Patent [19]

Goidich

[11] 4,095,534
[45] Jun. 20, 1978

[54] DAMPER WITH CURVED EXTENSION PLATES FOR WIDE RANGE FLOW CONTROL

[75] Inventor: Stephen John Goidich, Parsippany, N.J.

[73] Assignee: Foster Wheeler Energy Corporation, Livingston, N.J.

[21] Appl. No.: 769,377

[22] Filed: Feb. 16, 1977

[51] Int. Cl.[2] .............................................. F23D 19/00
[52] U.S. Cl. ................................ 110/263; 34/57 A; 138/46; 137/601; 432/58; 110/245; 110/299
[58] Field of Search ............. 34/57 R, 57 A; 110/8 F, 110/28 J; 138/46; 137/601; 251/208, 305, 306; 432/58

[56] References Cited

U.S. PATENT DOCUMENTS

| 2,145,086 | 1/1939 | Hoof | 138/46 |
| 2,759,697 | 8/1956 | Harza | 251/305 |
| 3,286,732 | 11/1966 | Alley | 138/46 |
| 3,613,256 | 10/1971 | Belopolsky et al. | 34/57 A |
| 3,625,165 | 12/1971 | Ishigaki | 110/28 J |
| 3,691,644 | 9/1972 | Schnitzer | 34/57 A |
| 3,809,361 | 5/1974 | Pfundstein et al. | 251/305 |
| 3,881,430 | 5/1975 | Katz | 110/28 J |

Primary Examiner—Kenneth W. Sprague
Attorney, Agent, or Firm—Marvin A. Naigur; John E. Wilson; Warren B. Kice

[57] ABSTRACT

A damper for fluid flow control has a curved extension plate positioned with respect to the circular path defined by the end of a pivotal damper blade to provide close control of the effective open area over a wide range of damper openings. The curved extension plate has a straight portion connected tangentially to one end of an arcuate portion. The arcuate portion of the extension plate approximates the shape of a theoretically ideal curve such that in cooperation with pivoting of the damper blade, the free flow area increases approximately linear with damper opening to provide a linear response between damper blade position and fluid flow rate.

6 Claims, 2 Drawing Figures

DAMPER WITH CURVED EXTENSION PLATES FOR WIDE RANGE FLOW CONTROL

BACKGROUND OF THE INVENTION

This invention relates generally to fluid flow control devices and, more particularly, to a flow control damper having a curved extension plate which provides for linear control over the fluid flow rate for a wide range of damper openings.

The use of fluidized beds has long been recognized as an attractive means of generating heat. In this use, air is normally passed through a bed of particulate material, which includes a particulate fossil fuel, to cause the material to expand and take on a suspended or fluidized state. The basic advantages of such an arrangement include an increase in combustion efficiency, an improved heat transfer rate, a uniform bed temperature, combustion of the fuel at lower temperatures, and ease of handling of the fuel materials.

Also, when the heat produced by the fluidized beds is utilized to convert water to steam, such as in a vapor generator, still other advantages ensue, such as a reduction in corrosion and boiler fouling and a reduction in boiler size. However, in a vapor generator environment there is an inherent limitation on the range of heat input to the water passing in a heat exchange relationship to the fluidized bed, principally due to the fact that the quantity of air supplied to the bed must be sufficient to maintain the bed in a fluidized condition and yet must not cause excess quantities of the fuel material to be blown away. Therefore, the requirement exists for an air flow control device which will permit close control of the air flow to the fluidized bed.

Many flow control devices, such as dampers, are known in the prior art for regulating the flow of fluid through a passage. These dampers, however, have not proven entirely satisfactory for controlling the quantity of air supplied to fluidized beds since they have not been capable of providing close control of the air flow. Generally, an excessively large flow is established when the dampers are first opened and they do not provide the necessary close control of the effective, open, flow area as the damper opening is increased.

SUMMARY OF THE INVENTION

It is, therefore, an object of the present invention to provide an improved damper having a high degree of close flow control over a wide range of damper blade openings.

Another object of the invention is to provide a damper with curved extension plates which cooperate with the damper blade to provide a substantial linear response between the blade opening and the fluid flow rate through the damper.

Yet another object of the present invention is to provide an improved damper for fluid flow control particularly adapted to control the flow of air provided to heat exchangers utilizing fluidized beds as a source of heat.

A further object of the present invention is to provide an improved flow control damper which will supply a predetermined quantity of fluid upon initial damper blade opening and thereafter provide linear-response control of the fluid flow through the damper.

Toward the fulfillment of these and other objects, the flow control damper of the present invention includes a damper extension plate having an arcuate portion positioned in cooperative relationship with a pivotal damper blade to provide a linear response between the damper blade opening and the fluid flow rate through the damper. The curved extension plate has an arcuate portion of constant radius joined at one end to a straight portion which is secured to the structure of the damper. The arcuate portion provides a structurally-simple approximation of the theoretically ideal shape required to obtain a substantially linear response between blade opening and fluid flow rate, and the straight portion of the extension plate provides the means to connect the arcuate portion to the duct wall without interference with the pivotal motion of the damper blade. The flow damper provided with the curved extension plate results in a flow control device permitting a predetermined initial flow rate upon first opening of the damper blade, and a subsequent close control of the effective, open, flow area as a result of the substantially linear relationship between blade opening and fluid flow rate.

BRIEF DESCRIPTION OF THE DRAWINGS

The above description, as well as further objects, features, and advantages of the present invention, will be more fully appreciated by reference to the following description of a presently preferred but nonetheless illustrative embodiment in accordance with the present invention, when taken in connection with the accompanying drawings, wherein.

DESCRIPTION OF THE PREFERRED EMBODIMENT

Figure 1:
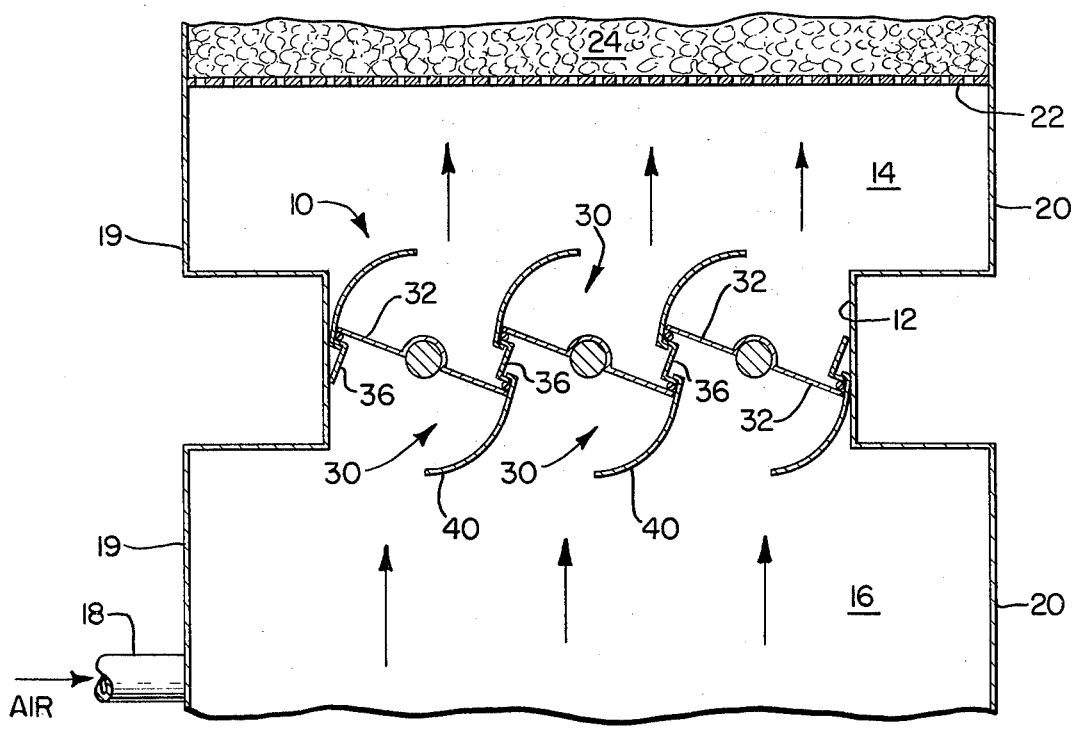
FIG. 1 is a schematic illustrating an example installation incorporating a damper assembly having a plurality of flow dampers of the present invention, with the structural elements of the installation shown in cross section.

Referring specifically to FIG. 1 of the drawings, the reference numeral 10 refers generally to a damper assembly positioned within a flow passage 12 leading to an air plenum chamber 14. The damper assembly 10 includes a plurality of flow dampers 30 according to the present invention and provides close control of the flow of air from an enclosure 16 into the air plenum chamber 14. Air from an outside source is introduced into the enclosure 16 through a suitable inlet 18, with the flow passage 12, the chamber 14, and the enclosure 16 being defined by front and rear walls 19 and 20, respectively, and a pair of side walls (not shown).

With continuing reference to FIG. 1, positioned within the air plenum chamber 16 and spaced above the damper assembly 10 is a perforated air distribution plate 22, which is adapted to support a bed 24 of particulate material consisting of inert material, a solid fuel material such as coal, and a sorbent material for the sulfur formed during combustion of the fuel if the fuel contains relatively large amounts of sulfur. The overall apparatus shown in FIG. 1 may, as an illustrative example, be incorporated into an appropriate heat transfer device wherein the heat produced by the bed which is fluidized during the combustion process is utilized to convert water to steam, such as in a vapor generator. In this regard, the inner surfaces of the walls 19 and 20 may be appropriately provided with suitable thermal insulation, such as refractory-material liners (not shown). While not specifically shown, it is understood that other additional and necessary structural elements would be incorporated with the structural components shown in FIG. 1 to effect an operative heat transfer device, these additional structural elements being known to one skilled in the art.

Figure 2:
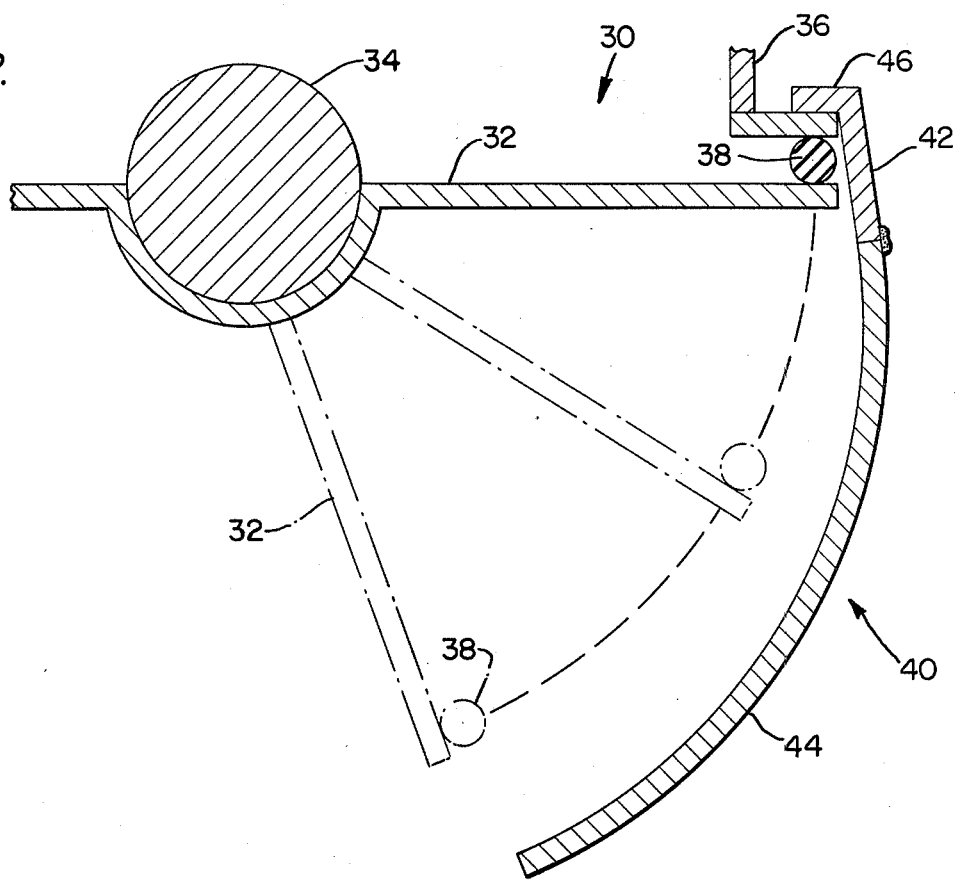
FIG. 2 shows, to an enlarged scale, one of the flow dampers of FIG. 1.

The structure of the flow control damper 30 according to the present invention may be seen more fully in FIG. 2 of the drawings. The damper 30 includes a damper blade 32, which has one end fixed to a shaft 34. The shaft 34 is rotatably supported so that rotation of the shaft causes pivotal movement of the damper blade 32. A fixed bracket 36 extends proximate to the free end of the damper blade 32 when the latter is in its closed position shown by the solid lines in FIG. 2. Attached to the free end of the damper blade 32 is a sealing member 38 which, when the damper blade is in the closed position, cooperates with the bracket 36 to provide a fluid seal. The sealing member 38 may be of any suitable material, such as metal, rubber, or other elastomeric-type materials.

An extension plate, denoted generally by the numeral 40, is positioned adjacent the free end of the damper blade 32, and includes a substantially straight portion 42 tangentially connected to an arcuate portion 44. A short extension 46 is integral with the straight portion 42 of the extension plate 40 and forms an obtuse angle, such as 98°, so that when the short extension is attached to the bracket 36, the straight portion and the arcuate portion 44 are positioned in a predetermined relationship with respect to the circular path defined by the pivotal motion of the free end of the damper blade 32. Although not specifically shown in the drawings, it is understood that the bracket 36 and the extension plate 40 extend between the side walls (not shown), and the side walls cooperate with portions of the front and rear walls 19 and 20, respectively, to define the flow passage 12. As a result of the foregoing, a gradually-increasing, free-flow area is provided through the flow control damper 30, which may be seen clearly in FIG. 2, wherein the circular path of the free end of the damper blade 32 is indicated by the broken lines, and the damper blade is shown in phantom in an intermediate and in the fully-open positions. Additionally, the straight portion 42 permits the arcuate portion 44 to be secured to the bracket 36 without interference between the extension plate 40 and the damper blade 32. Although, as a result of this straight portion 42, linear response of the flow damper 30 does not begin immediately upon movement of the damper blade 32, this is not a severe limitation since linear flow characteristics at this early stage of damper blade movement, i.e., during movement of the damper blade across the straight portion of the extension plate 40, is not important due to the fact that the bed of particulate material does not fluidize until a predetermined air flow velocity, such as three feet per second, is achieved.

An extension plate having a precise, mathematically-determined curvature may be designed that will produce an exact, linear fluid flow increase with damper blade opening. However, the manufacture of such a plate would be difficult and expensive. An extension plate similar to the plate 40 in FIG. 2, in which the arcuate portion 44 may be a circular curve, i.e., a curve of constant radius of curvature, permits the linear-flow response characteristics of the precise, mathematically-determined curve to be closely approximated. An extension plate similar to plate 40 would permit achievement of the necessary, minimum fluidizing velocity within a few degrees turn of the damper blade, after which a substantially-linear increase in flow would be achieved as the damper blade is opened further. An extension plate with a circular curvature can be easily fabricated from standard cylindrical stock, such as a portion of a standard-size pipe. As an illustrative example, the extension plate 40 may be fabricated from a 75° cut from a standard, 12-inch nominal pipe to provide the arcuate portion 44, with a 1⅜-inch straight segment welded tangentially to the end thereof to provide the straight portion 42. This extension plate 40 may then be positioned within the damper 30 so that in the 70° open position of the damper blade 32, the spacing between the blade seal 38 and the curved plate 44 is approximately 1 5/32 inches.

Referring to both FIGS. 1 and 2, it can be seen that a plurality of flow control dampers 30 may be arranged to form the damper assembly 10 to control the flow of air through the passage 12. A pair of damper blades 32, shown in the figures to be integrally formed, may be fixed to the rotatably-mounted shaft 34, with an extension plate 40 provided adjacent the free end of each of the damper blades, as shown more clearly in FIG. 1. The short extensions 46 on the straight portions 42 of adjacent pairs of extension plates 40 may be secured to the same bracket 36, which may be conveniently of a Z-shape so that the shorter legs of the Z would provide the attachment points for the short extensions. Thusly supported, the free ends of the extension plates 40 are disposed away from the bracket 36, upstream and downstream from the bracket relative to the flow through the damper assembly 10. At the front and rear walls 19 and 20, respectively, one of the shorter legs of the bracket 36 is removed since only one extension plate 40 is attached thereto, so that the bracket resembles an L in cross section. In the closed position of the damper assembly 10, each of the damper arms 32 is positioned adjacent to the shorter leg of the Z-shaped bracket 36, with the sealing members 38 abutting the bracket to provide a fluid seal.

It is understood that control means (not shown) may be provided to regulate the rotation of the shafts 34 and therefore the corresponding pivotal movement of the damper blades 32. Also, synchronous motion-control means (not shown) for the damper blades 32 may be incorporated into the damper assembly 10 to provide simultaneous control of the opening of the damper blades. These control means for regulating the movement of the shafts 34 and the damper blade 32 may be of any suitable type known in the art.

In operation, and with particular reference to FIG. 1, the damper blades 32 will be pivoted by the appropriate control means in a clockwise direction to admit air from the enclosure 16 into air plenum chamber 14, as indicated by the flow arrows. During the initial movement of the damper blades 32, there will not be a linear relationship between the quantity of air flowing through the damper assembly 10 and the size of the damper openings as the damper blades moves with respect to the straight portions 42 of the extension plates 40. As the damper blades 32 are rotated further, past the junctures of the straight portions 42 and the end of the arcuate portions 44, a predetermined air flow is obtained which will permit fluidizing of the particulate bed 24. As the damper blades 32 are rotated further into the open position, a substantially linear relationship will be obtained between the opening of the damper blades and the quantity of air flowing through the damper assembly 10 due to the gradually-increasing size of the apertures defined between the ends of the damper blades and the concave surfaces of the arcuate portions 44 of the extension plates 40.

While not shown specifically in the drawings to enhance the clarity of presentation, it is understood that the damper assembly 10, and its associated structure are appropriately mounted and supported to permit operation and cooperation in substantially the manner herein described.

Of course, variations of the specific instructions and arrangement of the flow control damper disclosed above can be made by those skilled in the art without departing from the invention as defined in the appended claims.

I claim:

1. In combination with a heat exchanger having a fluidized bed of particulate material as a source of heat, including a particulate fuel material, a flow control damper to control the flow of air to the fluidized bed, said damper comprising:

a blade element pivotally disposed for movement between a closed and open positions, the free end of said blade element moving in a curved path;

an extension plate disposed relative to said curved path to define a flow opening between the free end of said blade element and the surface of said extension plate, said plate having a substantially straight portion and an arcuate portion connected tangentially at one end to said straight portion, said arcuate portion having a substantially constant radius of curvature; and a sealing element disposed on the free end of said blade element to provide a fluid seal with said blade element in the closed position, said extension plate cooperating with said blade element during said movement of the latter to define a substantially linear relationship between the open positions of said blade element and the air flow rate through the damper.

2. The combination as defined in claim 1, wherein said substantially straight portion is disposed adjacent said blade element with said element in the closed position and is provided with an extension angularly disposed at one end to define an obtuse angle between the centerlines of said substantially straight portion and said extension, said extension being adapted for attachment to extension plate support means.

3. The combination as defined in claim 2, wherein said extension is disposed substantially parallel to said blade element with said blade element in the closed position.

4. The combination as defined in claim 1, wherein said arcuate portion comprises an arc segment of a circular cylindrical member.

5. The combination as defined in claim 1, wherein said flow control damper comprises:

a plurality of blade elements disposed in a flow passage;

a plurality of rotatable shafts for supporting said blade elements for pivotal movement of each of said blade element between a closed and open positions, with a pair of blade elements being supported by a common rotatable shaft and the other end of each of said blade elements moving in a curved path, a plurality of extension plates, each of said plates having a substantially straight portion and an acruate portion connected tangentially at one end to said straight portion, said arcuate portion comprising an arc segment of a circular cylindrical member;

a sealing element disposed on said other end of each of said blade elements; and a plurality of fixed support means to support each of said extension plates relative to the curved path of said other end of each of said blade elements to define a flow opening between said other end of said blade element and the concave surface of said extension plate, each of said support means supporting a pair of extension plates, with the free ends of said plates extending in substantial alignment with the flow direction through the flow passage, such that a substantially linear relationship is defined between the open positions of said blade element and the flow rate through the assembly.

6. The combination as defined in claim 5, wherein each of said substantially straight portions is provided with an extension attachable to said support means, said extension being disposed at an angular orientation to define an obtuse angle between the centerlines of said substantially straight portion and said extension.

* * * * *